United States Patent [19]

Rigazio et al.

[11] 3,912,881

[45] Oct. 14, 1975

[54] SCANNER DIAGNOSTIC ARRANGEMENT

[75] Inventors: Livio Angelo Rigazio, Freehold; Dennis Joseph Sassa, Englishtown, both of N.J.

[73] Assignee: Bell Telephone Laboratories, Incorporated, Murray Hill, N.J.

[22] Filed: Oct. 29, 1974

[21] Appl. No.: 518,477

[52] U.S. Cl. ...................... 179/175.2 R; 179/18 FG
[51] Int. Cl.$^2$ ........................................... H04M 3/24
[58] Field of Search.. 179/175.2 R, 175.2 C, 18 FG, 179/18 FF

[56] References Cited

UNITED STATES PATENTS

| | | | |
|---|---|---|---|
| 3,471,686 | 10/1969 | Connell | 235/153 |
| 3,532,825 | 10/1970 | Warman | 179/18 FG |
| 3,714,556 | 1/1973 | Risky | 179/175.2 R |
| 3,777,080 | 12/1973 | Padgett | 179/175.2 R |
| 3,813,032 | 5/1974 | King | 235/153 AC |

OTHER PUBLICATIONS

Bell System Tech. Journal, Oct. 1969, pp. 2674–2675.

*Primary Examiner*—Douglas W. Olms
*Attorney, Agent, or Firm*—J. W. Falk

[57] ABSTRACT

A diagnostic arrangement is disclosed for use in conjunction with a communication system to detect scanning difficulties. More specifically, duplicated scanners synchronously but independently provide reports indicating changes of state of a plurality of scan points. These reports are first buffered at the scanners and then transmitted over data links to a remote processor where the reports are compared. A mismatch indicates either a malfunctioning scanner or other scan point difficulty. To pick a scanner which is providing correct reports, simulation means in each scanner are controlled, when the associated scanner scans the problem scan point, to cause the problem scan point to appear to assume one state and to cause all the other scan points to appear to assume another state. When each scanner generates a report for this problem scan point, each report is bypassed around a buffer for immediate transmission to the remote processor. Because the processor expects to receive a predetermined report, the "malfunctioning" scanner can be detected based upon analysis of the reports actually received.

10 Claims, 5 Drawing Figures

SCANNER DIAGNOSTIC ARRANGEMENT

FIELD OF THE INVENTION

This invention pertains generally to diagnostic arrangements and, more particularly, to arrangements for diagnosing scanning difficulties. Even more particularly, this invention relates to diagnosing duplicated scanners which are remotely situated in relation to a controlling data processor.

BACKGROUND OF THE INVENTION AND PRIOR ART

One of the major considerations in designing equipment to be utilized in communication systems is reliability. Reliability is essential so that customers served by the system will not experience any inconvenience or delay even when equipment problems develop in the communication system. To meet this high standard of reliability, major functional equipment in a communication system is often duplicated. The duplicated equipment is normally operating and comparison of information in or from the duplicated equipment is continually made to ensure the operating integrity of the duplicated system. One such arrangement is taught in J. B. Connell U.S. Pat. No. 3,471,686, issued Oct. 7, 1969, in which comparisons are instituted between reports of two processing entities doing identical work.

An integral function of most communication systems is scanning a plurality of lines, trunks, data links or other similar circuits to detect data, service requests and call information such as dial digits. In some systems such as the No. 1 ESS, (which is described in detail in *Bell System Technical Journal*, Volume 43, September 1964, No. 5, Parts 1 and 2), duplicated scanners are provided to ensure that service requests are properly detected. In systems utilizing duplicated equipment, when the reports from the equipment do not match, a determination must be made immediately to ascertain which "half" of the equipment is providing correct information. This is extremely critical for scanners because inaccurate scanning may result in the failure to detect service requests and eventually the breakdown of established talking paths, thereby seriously affecting the ability of the communication system to provide reliable service.

One technique utilized in the prior art to diagnose the functionality of a scanner is to "drive" a group of scan points into a known state and then to ascertain if the scanner reports properly and indicates that all scan points in this group are in fact in that state. Such a technique is described on page 2674 of Vol. 48 of the *Bell System Technical Journal*, October 1969. This arrangement is highly effective to diagnose many scanner problems. However, if there is any interference between scan points in the enabled group, this will not be detected by this arrangement. Such an interference situation can arise when the decoder, normally used to selectively enable scan points, malfunctions and generates multiple output signals thereby enabling more than one scan point simultaneously. Thus, the outputs of two or more scan points may be combined and, unknown to the scanner, the state of the instant scan point under consideration may be changed. This intereference is dependent on the state of the interfering scan point, and may go away if that scan point changes state. Therefore, interference problems are very difficult to detect because of their transitory nature.

It is an object of this invention to effectively diagnose various difficulties with scanners and to effectively identify which of a pair of scanners is providing correct reports even when interference exists between scan points.

It is a further object of this invention to expedite transmission of diagnostic reports from remote scanners to a central processing unit and, more specifically, to expedite the transmission of only selected diagnostic reports.

SUMMARY OF THE INVENTION

In accordance with the principles of this invention, when a problem scan point is scanned by a scanner, this scan point is forced to appear to be in one state, and all the other scan points are forced to appear to be in another state. As described below, this fixes the interference between the scan points and makes such interference detectable because if interference does exist, the forced state of the problem scan point will be changed by the interference. Furthermore, in accordance with the principles of this invention, buffer bypass circuitry is activated to bypass reports for the problem scan point around a buffer normally used to store reports prior to transmission thereof. This circuitry is activated when "maximum intereference" is applied to the scan points, and serves to expedite the transmission of a report concerning the problem scan point.

In this one illustrative embodiment of our invention, duplicate scanners synchronously but independently provide reports indicating changes of state for a plurality of scan points. The reports from each scanner are normally buffered and then transmitted over an independent data link to a remote processor where the reports from the scanners are compared. Because the scanners operate synchronously (i.e., scan the same scan point at the same time), the reports transmitted over the data links should match. However, a mismatch indicates a scan point problem or a malfunctioning scanner.

In response to this mismatch, the processor initiates diagnostic fault recognition procedures to identify a scanner providing correct reports. More specifically, the processor first sends a command to the scanners to inhibit them from transmitting further reports from their buffers because the accuracy of such reports is questionable. To expedite diagnostic operations, only diagnostic reports and more particularly only diagnostic reports for the "problem" scan point associated with the mismatch are conveyed to the processor.

A pair of input leads are connected to each scan point with an input lead extending to each scanner. Each input lead normally indicates to the scanner connected thereto the state of the scan point also connected thereto; however, simulation means in each scanner are selectively energized to change the state of the input leads connected to this scanner so that the scan points appear to this scanner to be in certain states irrespective of their actual states. Thus, the simulation means in one scanner only changes the state of the input leads connected to that scanner.

As described below, tests are independently conducted by each scanner to detect scanning problems even when interference exists between scan points or their input leads. To elaborate, when a scanner scans the problem scan point, the simulation means therein during a first test cause all its input leads to assume one state so that all scan points appear to the scanner to be in that one state, and more specifically, the problem scan point now being scanned appears to be in that one state. This first test is instituted to force the problem scan point to appear to be in a known state so that later during a second test a change of state can be forced and the appropriate scanner report generated.

Then, when the scanner subsequently scans the problem scan point during a second test, the simulation means therein causes the input lead associated with problem scan point to assume a different state and causes all other input leads to assume that one state. This causes maximum interference between the scan point input leads connected to the scanner so that any possible interference between these leads (e.g., because of multiple enables) becomes a fixed albeit unknown variable. Thus, even if an interfering scan point later changes state, it will still appear to cause interference, and therefore even transient interference problems can be overcome.

Since the input lead associated with the problem scan point changed state (i.e., went from one state during the first test to the different state during the second test), the scanner normally generates a report for this scan point. However, if interference exists, the problem scan point will appear not to change state because the one state of the interfering scan point(s) will make the problem scan point also appear to be in that one state when it should appear to be in the different state. Accordingly, no report will be generated thereby alerting the processor to the problem. Thus, the other input leads are forced to a different state so that if interference does in fact exist with the problem scan point, then the simulated state of this problem scan point will change; and in this one illustrative embodiment this change is detected by the failure of the scanner to generate a report.

Since the processor is waiting to receive only the report for this scan point and the corresponding report for this scan point from the other scanner, the transmission of all other reports to the processor is inhibited. Moreover, to expedite transmission of these reports to avoid the normal buffering delay, the report generated by each scanner concerning the problem scan point is bypassed around the associated buffer and thereby applied from the input of the buffer directly to the output of the buffer so that the report is immediately transmitted to the processor. In this illustrative embodiment of our invention, this buffer bypass is activated by the same circuitry that causes the maximum interference. More specifically, a register in each scanner is provided for storing the address of the problem scan point, and a comparator compares this address with an address in the scanner identifying the scan point being scanned. When a match occurs indicating the problem scan point is being scanned, the comparator generates outputs which cause maximum intereference and also activate the buffer bypass. Because the processor expects to receive a predetermined report, analysis of the reports actually received indicates which scanner is providing correct reports. The system is then reconfigured so that only reports from the good scanner are utilized. Normal call processing can then be quickly reinstituted.

This one illustrative embodiment of our invention pertains to diagnosing scanners remotely situated from a processing unit and is directed to identify a correctly operating scanner when a malfunction occurs caused, for example, by one of the following:

1. A scan point address counter in one scanner is stuck or skips a count;
2. Scan point interface circuitry, including an input lead and gates, between a scan point and a scanner may have failed; or
3. A decoder, which is utilized to selectively enable the scan points, may have failed causing multiple enables so that the state of other scan points is "combined" with the state of the scan point being scanned.

This diagnostic fault recognition arrangement overcomes two problems, namely, an uncertain amount of interference from scan points other than the one being scanned, and, a slow response to diagnostic tests due to report buffering.

In accordance with a feature of our invention, the input lead associated with the problem scan point is forced into one state while all the other input leads are forced into another state, thereby fixing any possible interference between the scan points. More specifically, this maximum interference is instituted only when the problem scan point is being scanned.

In accordance with another feature of our invention, buffer bypass circuitry is provided to bypass diagnostic reports around the buffer so that such reports can be immediately transmitted over a communication channel. More specifically, this bypass is operable so that only scanner reports for a selected scan point are conveyed over the communication channel.

In accordance with still another feature of our invention, a diagnostic fault recognition system in a communication system including duplicated scanners effectively utilizes matching of reports, maximum interference, and buffer bypass circuitry to expeditiously identify problems and then to identify a scanner which is providing correct reports.

BRIEF DESCRIPTION OF THE DRAWING

The foregoing as well as other objects, features and advantages of our invention will be more apparent from a description of the drawing in which FIGS. 3 and 4 when arranged as shown in FIG. 5 illustrate some of the structure of an illustrative embodiment of our invention.

More specifically, FIG. 1 illustrates in block diagram form the communication system in which this embodiment of our diagnostic arrangement is implemented.

FIG. 5 illustrates the manner in which FIGs. 3 and 4 are to be combined.

General Description

Figures 1, 5:
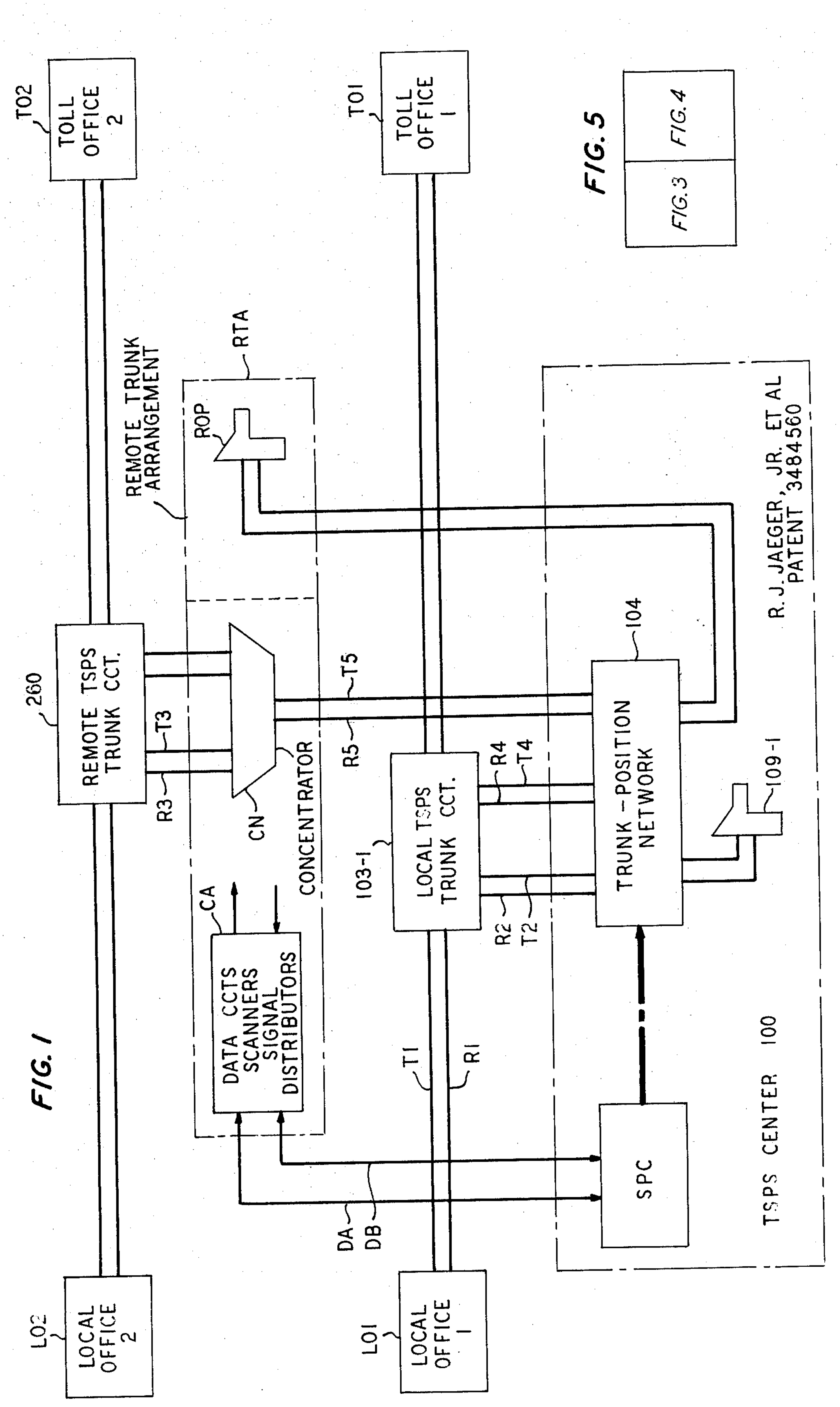

FIG. 1 illustrates, in block diagram form, a communication system in which this illustrative embodiment of the diagnostic arrangement is implemented. The overall purpose of the depicted communication system is to provide automated service for certain types of telephone calls requiring operator assistance. The original system designed to automate many of the routine aspects of operator's work is called the "Traffic Service Position System No. 1" (TSPS No. 1) and is depicted as TSPS Center 100. To generalize the operation of center 100, calls are received through local telephone office LO1 and connected to leads T1 and R1 extending to local TSPS trunk circuit 103-1. The connection is further established through circuit 103-1 over leads R2 and T2 to trunk position network 104. Leads R2 and T2 are then connected to operator's position 109-1 by network 104 under the control of data processing unit SPC. The operator associated with position 109-1 then talks to the calling party and indicates that, for example, a certain amount of money must be deposited in the calling coin station before the desired connection is established. After coin deposit, the number of the called station is then outpulsed through network 104 over leads R4 and T4 and through circuit 103-1 to toll office TO1 which then establishes the connection to the called station. Trunk circuit 103-1 is then controlled to cut through leads T1 and R1 to toll office TO1 and the desired voice path is thereby established.

As mentioned previously, processor SPC controls the establishment of connections in network 104 and also controls the closure of contacts in circuit 103-1. Data processor SPC comprises duplicated processing units operating in accordance with stored program instructions to control most aspects of TSPS Center 100. Processor SPC is comprehensively described in Vol. 49 of the *BSTJ*, dated December 1970. TSPS Center 100 is extensively described in R. J. Jaeger, Jr. et al. U.S. Pat. No. 3,484,560, issued Dec. 16, 1969. All structure in TSPS Center 100 (also including circuit 103-1) corresponds to its similarly designated counterparts in the above-specified Jaeger patent.

TSPS No. 1 proved to be a highly effective system and substantially decreased the number of operators required to serve coin stations. However, the original system included certain limitations that sometimes created personnel difficulties. In particular, all trunk circuits and operator positions had to be located relatively close to the TSPS center. Accordingly, operators were sometimes forced to work in locations undesirable from a geographic standpoint.

In a first improvement on TSPS No. 1, additional circuitry was provided so that the operators' positions could be remote from the main TSPS center; and accordingly, operator centers could be established in areas where sufficient numbers of operators were available. The remote operator positions were controlled utilizing carrier systems in which the control information was interspersed on a time division basis with the voice communication.

In a second improvement as taught by A. E. Joel, Jr. U.S. Pat. No. 3,731,000, issued May 1, 1973, groups of TSPS trunk circuits could be located substantial distances away from the main TSPS center. Accordingly, it was then feasible to serve toll centers which were not large enough to support an entire TSPS complex by themselves. A concentrator switch was provided to connect the remote TSPS trunk circuits to the TSPS center, so that the number of voice paths to the TSPS center could be reduced. The concentrator switch was controlled based upon control information conveyed over the voice paths.

In another improvement to the basic TSPS system as shown in the upper part of FIG. 1, the remote TSPS trunk circuits and operators' positions are located close to the same remote facility so that common control apparatus in the remote facility can be utilized to control both the operators' positions and the establishment of connections through the remote trunk circuits and concentrator. In previous systems the control information was conveyed over the voice paths; however, in this arrangement called the remote trunk arrangement (or RTA), duplicated data links DA and DB distinct from the voice paths are provided for conveyance of control information from the SPC.

Calls instituted through local office LO2 served by the RTA are provided the same high quality service that is provided to callers associated with local office LO1 served directly by TSPS center 100. More specifically, a call through local office LO2 is cut through a remote TSPS trunk circuit such as 260 to concentrator CN over leads R3 and T3 and to trunk position network 104 via leads R5 and T5. Now the calling station is connected by network 104 to one of the operator positions such as 109-1 associated with network 104, or to one of the remote operator positions ROP in the remote trunk arrangement. In fact, calls through local office LO1 can be handled by operators associated with the RTA. The RTA makes operator staffing much easier by affording versatility to the user of the communication system.

This embodiment of our invention pertains to providing diagnostic and maintenance service for control circuitry CA in the RTA and particularly the scanners in the RTA. This control circuitry comprises scanners, data circuits and signal distributors which communicate with the SPC over data links DA and DB. This circuitry will be shown in greater detail in ensuing figures.

Trunk circuit 260 is substantially identical to trunk circuit 103-1 described in the above-mentioned Jaegar patent. Moreover, operator positions ROP are also substantially identical to those such as 109-1 in the Jaeger patent. A suitable concentrator CN is disclosed in A. F. Bulfer application Ser. No. 512,256 filed Oct. 4, 1974. The communication over data links DA and DB is described in substantial detail in L. Caron application, Ser. No. 479,891, filed June 17, 1974.

Figure 2:
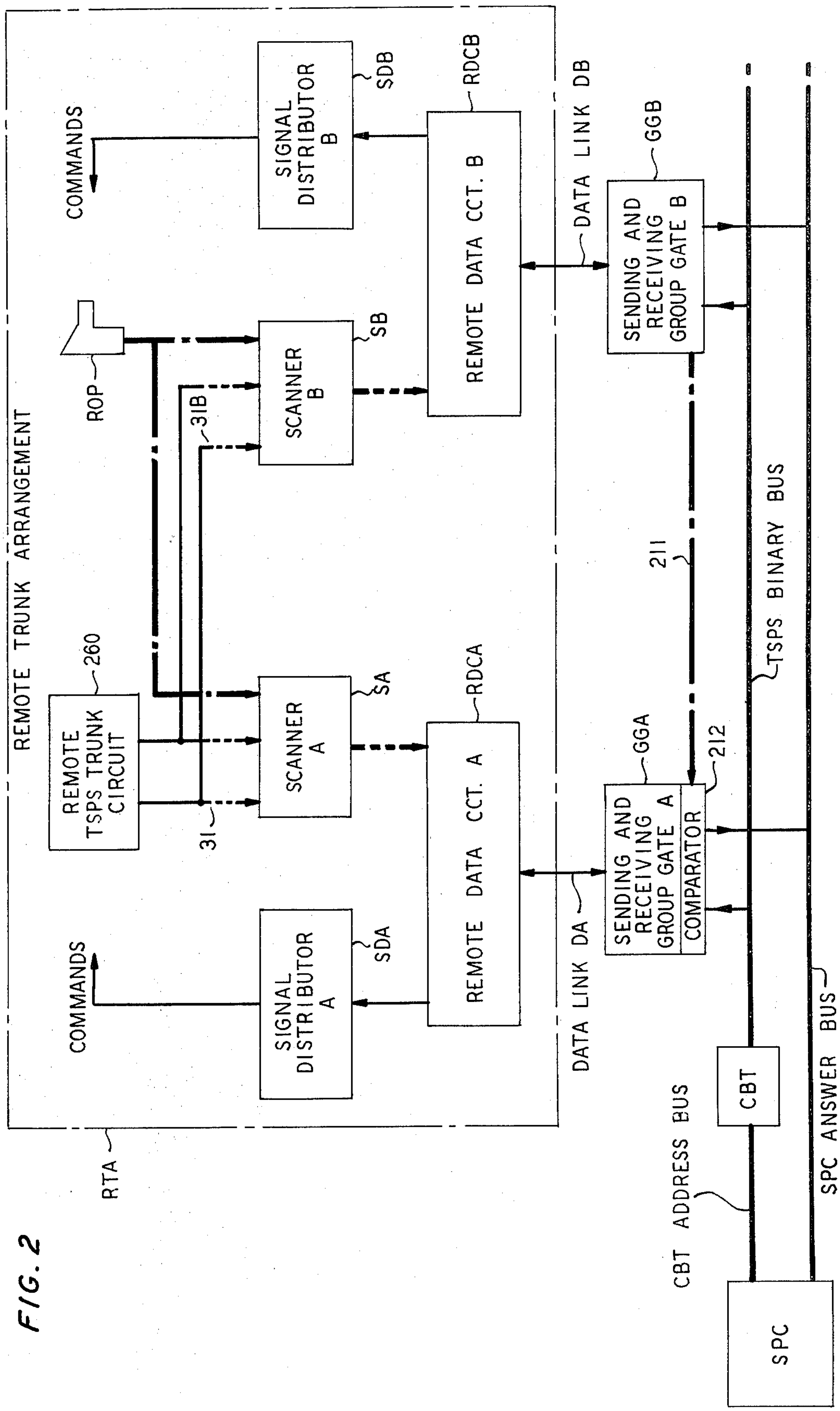
FIG. 2 illustrates in block diagram form some of the duplicated control circuitry utilized to control the estabishement of paths in the communication system of FIG. 1.

FIG. 2 illustrates in greater detail the control circuitry for conveying control information between the SPC and the RTA. The various control circuits in the RTA are also illustrated. Basically, the SPC provides commands over the CBT address bus to communications bus translator CBT which decodes the orders and applies a translated order to the TSPS peripheral units over the TSPS binary bus. The communication buses in the TSPS system and the operation of the CBT are described on page 2562 et seq., of the above-specified December 1970 *BSTJ*. An order destined for the RTA is applied to sending and receiving group gate circuits GGA and GGB which then independently transmit the order over data links DA and DB, respectively. This order is independently received by remote data circuits RDCA and RDCB. Circuits RDCA and RDCB respectively apply the order to signal distributors SDA and SDB. Each signal distributor decodes the order and the active or controlling signal distributor actually generates an appropriate command to control concentrator CN, remote TSPS trunk circuit 260, or operator's position ROP.

Most reports which are conveyed to the SPC originate in scanners SA and SB. These scanners are structurally identical and operate to synchronously scan a plurality of scan points in the remote trunk circuits and the remote operators' positions. Each scan point is multiplied to each scanner over an input lead such as 31 or 31B. These input leads indicate the state of the associated scan point. These scanners are adapted to report only substantial changes of state such as those associated with seizures; disconnects; end of a dial digit; or operator service requests. These scanner reports are first buffered (not shown in FIG. 2) and then applied to the appropriate circuit RDCA or RDCB for transmission over links DA or DB to circuits GGA or GGB. Then, the report received by circuit GGB is applied over cable 211 to comparator 212 associated with circuit GGA. Comparator 212 then compares the report received over data links DA with the report received over cable 211 from group state GGB. Since scanners SA and SB operate in synchronism and scan the identical scan points at the same time, the received reports should match. After a match is detected, the report received by circuit GGA is applied to the SPC answer bus and thereby received by the SPC for further processing in accordance with its stored program so that the appropriate orders can be generated. A suitable scanner SA or SB is comprehensively described in D. J. Sassa (Case 1), application, Ser. No. 449,122, filed Aug. 21, 1974, which is incorporated by reference herein.

DETAILED DESCRIPTION

Figure 3:
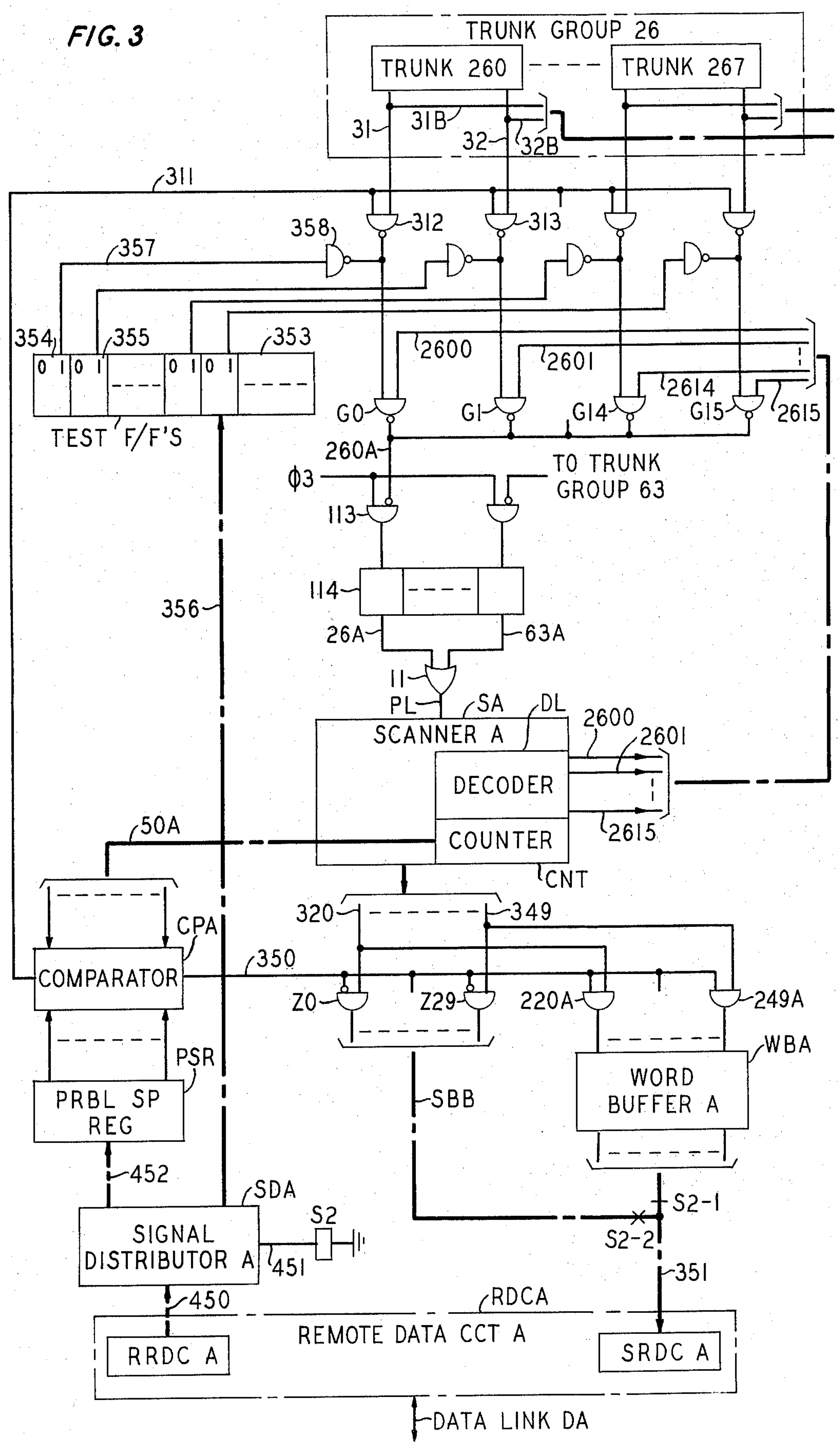
FIG. 3 illustrates scanner SA and the diagnostic circuitry and scan point interface circuitry associated therewith.
Figure 4:
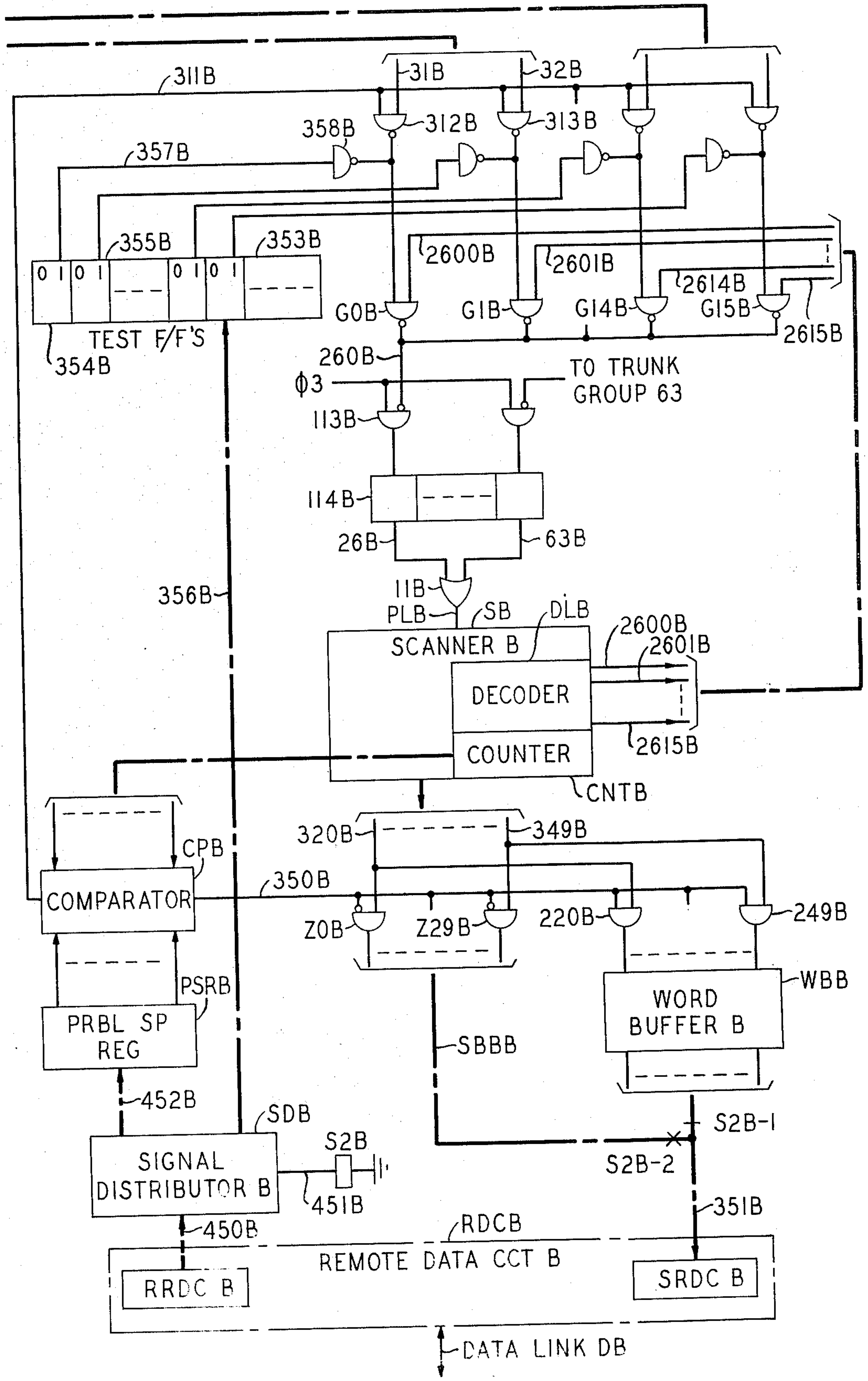
FIG. 4 illustrates similar circuitry associated with scanner SB, which is functionally identical to scanner SA.

FIGS. 3 and 4 show the diagnostic circuitry in this one illustrative embodiment of our invention, including buffer bypass circuitry and maximum interference circuitry.

FIG. 3 discloses the so-called A side of the control apparatus in the RTA including scanner SA and signal distributor SDA previously discussed. FIG. 4 discloses the B side of the system including scanner SB and signal distributor SDB. The B side of the RTA is substantially identical to the A side.

The upper portion of FIG. 3 illustrates various trunks 260–267 in trunk group 26. Each of these trunks is a remote TSPS trunk circuit such as 260 mentioned previously. Each remote trunk includes two scan points. One scan point is associated with the communication path extending to local office LO2 in FIG. 1 and the other scan point is associated with the communication path extending to toll office TO2. Input lead 31 in FIG. 3 and input lead 31B extending to FIG. 4 each indicates the state of the scan point in trunk 260 associated with the local office. Each of these leads goes HIGH when the trunk (calling station) goes on-hook and goes LOW when the trunk goes off-hook. Leads 32 and 32B indicate the state of the scan point in trunk 260 associated with toll office TO2 in a similar manner. The reception of signals by the trunks is described in greater detail in the above-mentioned D. J. Sassa application.

Scanner interface circuitry is provided between each of the scan points and scanner SA. As described hereinafter, this circuitry is controllable to cause the input lead associated with the scan point to assume a given state irrespective of the actual state of the scanpoint. Moreover this circuitry is selectively enabled by scanner SA so that one scan point can be scanned at a time, with the present state (or present look indication) of the scan point being conveyed to scanner SA over lead PL.

Scanner SA includes thirteen-stage binary counter CNT which is consecutively incremented by a 1.0368 MHz clock (not shown) and serves to temporarily store an address identifying the instant scan point being scanned. More specifically the address in counter CNT is decoded by decoder DL which generates HIGH output on one of the enable leads such as 2600, 2601, 2614, or 2615 so that the present state of the addressed scan point is applied to scanner SA. More specifically, this HIGH output serves to selectively enable one of the gates G0–G15. When the count in counter CNT is incremented, decoder DL responsive to the new count enables another one of these gates to interrogate the next scan point.

For example, we will assume that input lead 31 is LOW indicating that the calling station is off-hook. Lead 311 is normally HIGH and therefore NAND gate 312 generates a HIGH output signal. When lead 2600 goes HIGH responsive to the application of a HIGH potential thereto by decoder DL (i.e., when the scan point associated with input lead 31 is scanned), gate GO generates a LOW output signal over lead 260A. This LOW signal is inverted at the input of AND gate 113 which generates a HIGH output at the time interval $\phi3$.

Counter CNT is incremented each cycle of the 1.0368 MHz clock and, as described in the above specified Sassa application, each cycle is divided into ten equal time intervals designated $\phi0$–$\phi9$. $\phi0$–$\phi9$ also represent leads enabled by the clock during the respective time intervals. Thus at $\phi3$ in the cycle in which counter CNT contains the address associated with lead 31, lead $\phi3$ is HIGH and AND gate 113 generates a HIGH output and a "1" is thereby inserted into the first stage of register 114. Register 114 comprises 38 flip-flops respectively corresponding to the 38 trunk groups designated trunk group 26-trunk group 63. To simplify this disclosure, only trunk group 26 is illustrated; however, it should be understood that the RTA includes other essential identical trunk groups with the same type of scanner interface circuitry as that described previously in regard to trunk group 26.

Because a scan gate in trunk group 26 is being scanned, the first stage of register 114 now indicates the state of this scan point; whereas each of the other stages have "0s" inserted therein. Responsive to the HIGH output over lead 26A, OR gate 11 generates a HIGH output over present-look lead PL into scanner SA. Scanner SA now undates its memory to indicate that at the last-look input lead 31 was "off-hook."

We will assume that at a subsequent scan, lead 31 goes HIGH indicating that the calling station went on-hook. The fact that lead 31 went from a LOW state to a HIGH state indicates a disconnect. Scanner SA generates the appropriate disconnect report and outputs this report over leads 320–349. Lead 350 is normally HIGH so that the report outut from scanner SA is applied to word buffer WBA via gates 320A–349A. Word buffer WBA comprises storage space for 31 reports and operates to compensate for the fact that scanner SA is capable of generating reports faster than remote data circuit RDCA and more specifically the transmitting portion thereof SRDCA can send the reports over data link DA to the SPC.

When the report associated with input lead 31 passes through buffer WBA, it is output over cable 351 via unoperated break contact S2-1 to sending remote data circuit SRDCA. Contact S2-1 symbolizes a separate break contact for each one of the various leads in cable 351. Circuit SRDCA comprises a well-known data set for converting the binary information input thereto into a form suitable for transmission over a data link. The operation of such circuits is described in some detail in James Martin's book entitled *Telecommunications and the Computer*, published in 1969 by Prentice Hall.

The preceding has described how scanner SA interrogates a scan point to determine its present state and operates to generate a report if a change of state has occurred. This report was first conveyed to word buffer WBA and finally to circuit SRDCA for transmission over data link DA to the SPC.

Scanner SB in FIG. 4 autonomously operates in an identical manner to that previously described in relation to scanner SA. Input lead 31 is also multipled over input lead 31B to similar scanner input interface circuit associated with the B side of the RTA as shown in FIG. 4. Thus lead 31B serves as an input to NAND gate 312B which performs the same function as gate 312 previously described in FIG. 3. Similarly lead 32 in FIG. 3 is multipled to gate 313B via lead 32B in FIG. 4 and so on for each of the other scan points.

Scanner SB operates in synchronism with scanner SA so that both scanners scan the same scan point at the same time. However, the scanners (except for a common clock input) operate independently of each other and thereby generate independent reports for the scan points. Thus while decoder DL in scanner SA was enabling gate GO by applying a HIGH signal on lead 2600, scanner SB was enabling gate GOB by applying a HIGH signal on lead 2600B. Thus a "1" was inserted in the first bit position of register 114B which bit was output over lead 26B to OR gate 11B which applied a HIGH signal over lead PLB to scanner SB. Scanner SB then generated a report identical to that of scanner SA and applied the report over leads 320B–349B. Lead 350B is normally HIGH and accordingly AND gates 320B–349B gate the report into word buffer WBB. The report was then applied over cable 351B to sending remote data circuit SRDCB for conveyance over data link DB.

With respect to FIG. 2, the report from scanner SA was received by sending and receiving group gate GGA and demodulated to return the report to its original binary form. Similarly circuit GGB received the report from scanner SB and demodulated the report to its original binary form. Circuit GGB then conveys its report to comparator 212 which compares the report with the report received from circuit GGA. A match indicates that both scanners are operating correctly, and the report is then conveyed from circuit GGA to the SPC answer bus where it is acted upon by processor SPC.

Report Mismatch and Diagnostic Operations

The diagnostic arrangement is operable when reports from the two scanners do not match. This mismatch indicates either a scan point problem or scanner malfunction. When a mismatch occurs, group gate GGA in FIG. 2 so indicates to processor SPC. Prior to instituting remedial action, the processor waits to see if the mismatch was caused by a transient transmission problem. Therefore, the processor retries the reports from the scanners for about 100 ms to eliminate the possibility of transmission errors.

If the mismatch does not clear up, then the processor must begin diagnostic operations to choose the scanner providing correct reports. At this time, the SPC is aware that a problem exists but does not know whether reports in word buffers WBA and WBB are correct or incorrect. Therefore, the SPC applies an order to the CBT, which order is conveyed by circuits GGA and GGB over the data links to remote data circuits RDCA and RDCB. With reference to FIG. 3, the report received over data link DA from circuit GGA is received by the receiving remote data circuit RRDCA, demodulated, and then conveyed over cable 450 to signal distributor SDA. Distributor SDA then decodes the order and responsive thereto applies a HIGH signal on lead 451 to operate relay S2. Break contacts S2-1 open to prevent any further reports in buffer WBA from being transmitted back to the SPC. Make contacts S2-2 close so that the diagnostic reports can be bypassed around the buffer over selective bypass cable SBB, as hereinafter described.

Similarly, in response to the order received over data link DB and from circuit RRDCB, distributor SDB in FIG. 4 applies a HIGH output over lead 451B to operate relay S2B. Break contacts S2B-1 open and make contacts S2B-2 close to establish a buffer bypass around buffer WBB via cable SBBB. Under the control of the SPC, the system assumes a simplex mode of operation and no further comparisons are instituted between reports from scanners SA and SB, and instead group gates GGA and GGB each apply the reports received thereby to the SPC answer bus.

To facilitate an understanding of the operation of this illustrative embodiment of our invention, we will assume the mismatch occurred after the A side generated and transmitted a report indicating a seizure at scan point address 00 . . . 001 corresponding to input lead 31 from trunk 260, whereas the B side generated and transmitted a report indicating a seizure at address 00 . . . 010 corresponding to input lead 32B. These reports appeared as follows:

A side report — | 0 | 1 | 0 | 0 | 0...0 | 0000 | 00...001 |

B side report — | 0 | 1 | 0 | 0 | 0...0 | 0000 | 00...010 | where the "1" in the second bit position indicates a seizure, and the last thirteen bits indicate the address of the scan point for which the report was generated (e.g., the present count in counter CNT for the A half). The use of the other bits is not relevant for this example, but further description of these reports may be found in the above-specified Sassa application.

At this time it is not apparent which scanner is providing correct reports, and in fact both scanners may be operating correctly. It is also not known whether these reports accurately reflect the state of these two scan points. This problem could be caused by various malfunctions such as (1) failure of the scan point interface circuitry, (2) the sticking or skipping of an address by either counter CNT in FIG. 3 or counter CNTB in FIG. 4, or (3) a multiple enable caused by either decoder DL in FIG. 3 or decoder DLB in FIG. 4 interrogating more than one scan point at a time. Thus, for example, the report concerning lead 31 might be generated because both enable leads 2600 and 2601 were simultaneously HIGH and therefore both gates G0 and G1 were enabled and the present state of the scan point indicated over lead 32 (if LOW and if lead 31 was HIGH) was being conveyed as present-look information into scanner SA over lead PL while the scanner was attempting to scan only the gate associated with lead 31. This occurs because gates G0–G15 are tied to common output lead 260A, and if one gate generates a LOW output, then lead 260A goes LOW even if all the other gates apply HIGH outputs thereto. Thus, if gate G0 and G1 are enabled and gate G0 applies a HIGH output and gate G1 applies a LOW output lead 260A goes LOW even though gate G0 tried to drive lead 260A HIGH. Thus, a multiple enable may cause a scan point to appear to be in a different state than its actual state. It should be noted that gates G0–G15, except when enabled, generate HIGH outputs which do not interfere with the level of lead 260A.

The basic diagnostic strategy herein is to identify a scanner providing correct reports as soon as possible so that the effect on real-time call processing is minimal, and then to determine the cause of the problem. Therefore, the SPC first assumes that the problem scan point is the one identified by address 00 . . . 001 (i.e., scan point in trunk 260 connected to input leads 31 and 31B). A diagnostic order is now applied to group gates GGA and GGB in FIG. 2 and transmitted over the respective data links to circuits RDCA and RDCB. This order is applied to signal distributor SDA which decodes the order and responsive thereto applies the address of the problem scan point to register PSR via cable 452. Distributor SDB applies the same address (i.e., 00 . . . 01) over lead 452B to a register PSRB, and independently operates exactly as does side A, as described below.

When counter CNT in FIG. 3 assumes the address 00 . . . 001 as indicated over cable 50A, comparator CPA generates a LOW output over lead 311 indicating that scanner SA is now scanning the problem scan point. This LOW signal forces all the gates such as 312 and 313 to generate HIGH outputs irrespective of the present state of the scan point associated therewith. Accordingly, gate GO generates a LOW output when lead 2600 is HIGH responsive to counter CNT assuming address 00 . . . 001. As discussed previously, lead PL goes HIGH and, accordingly, scanner SA detects that the scan point associated with lead 31 is HIGH. The LOW signal on lead 311 causes the scanner interface circuitry for each of the scan points to indicate that their respective scan points were LOW irrespective of the actual state of the scan points. This causes maximum interference between the scan points, and thus any possible interference between the scan points such as that caused by multiple enables is forced into a fixed, albeit unknown state, as hereinafter described.

In a similar manner when a scanner SB scans the scan point associated with input lead 31B, lead 311B goes LOW, under the control of comparator CPB, forcing the present-look information applied over lead PLB to scanner SB to indicate a HIGH state.

Scanners SA and SB may or may not generate a report depending upon the previously recorded state of the respective scan point input leads 31 and 31B. Thus, if scanner SA's memory (not shown) indicated that scan point associated with lead 31 was HIGH previously, then scanner SA would not generate a report because a change of state had not occurred. If the SPC received a report from one side and not from the other side, then it is apparent that the side sending the report is operating incorrectly and the side that failed to send the report is not operating correctly.

In accordance with an aspect of this invention, a selectively energizable bypass path (SBB, SBBB) is provided around each of word buffers WBA and WBB for applying reports from the respective scanners SA and SB directly to the respective data circuits RDCA and RDCB thereby avoiding the normal buffering delays. These bypasses are energized only when a report for a problem scan point is generated. More specifically, normally lead 350 from comparator CPA is HIGH enabling gates 320–A349A so that reports are applied to word buffer WBA; however, when the address in register PSR matches the address in counter CNT indicating that the problem scan point is being scanned, comparator CPA causes lead 350 to go LOW (lead 311 goes LOW at the same time as previously described) which enables gates Z0–Z29. Gates Z0–Z29 apply the report for the problem scan point over cable SBB through previously closed contacts S2-2 to circuit RDCA which transmits the report over data link DA.

Buffer bypass SBBB in FIG. 4 is similarly enabled to bypass reports for the problem scan point around word buffer WBB so that these reports can be immediately transmitted to the SPC over data link DB. To elaborate, normally lead 350B is HIGH; however, when the problem scan point is scanned (i.e., input lead 31B) comparator CPB causes lead 350B to go LOW enabling gates Z0B–Z29B and disabling gates 320B–349B. Gates Z0B-Z29B apply the report from scanner SB over cable SBBB through previously closed contacts S2B-2 to circuit RDCB.

If both scanners successfully pass the preceding test in which an all "1s" condition was applied to the scan points, then in accordance with another aspect of this invention another test is instituted in which the output gate 312 associated with input lead 31 is driven LOW while each of the other scan point gate outputs is driven HIGH. This is called a maximum interference test and determines whether the scan point interface circuitry associated with the other scan points is affecting the simulated state of the problem scan point. More specifically, the SPC sends an order to each of the signal distributors to set a particular flip-flop associated with the problem scan point. To elaborate, a plurality of test flip-flops are included in group 353 with each flip-flop corresponding to a diferent one of the scan points. For example, flip-flop 354 is associated with input lead 31 and flip-flop 355 is associated with input lead 32. With reference to FIG. 4, a plurality of test flip-flops are also provided in group 353B with each of the flip-flops therein corresponding to a different one of the scan points. In other embodiments, the same plurality of test flip-flops can be used with each signal distributor being able to independently set or reset the flip-flops. Since the problem scan point is the scan point associated with input lead 31, the SPC generates an order which is conveyed to signal distributors SDA and SDB and individually decoded. Distributor SDA applies the appropriate signals over cable 356 to set flip-flop 354, and reset each of the other flip-flops as 355 in test flip-flop group 353. The HIGH output signal on lead 357 from flip-flop 354 in FIG. 3 causes inverter gate 358 to generate a LOW output signal which, as described previously, causes a "0" to be inserted in the first stage of register 114 irrespective of the actual state of lead 31 when lead 31 is scanned and therefore forces the present-look information applied to scanner SA to a "0" or a LOW state. However, when lead 2600 is enabled, comparator CPA forces lead 311 to go LOW and the gates such as 312 and 313 generate HIGH outputs. However, gate 358 forces the output of gate 312 alone to go LOW. Thus, gate GO generates a HIGH output signal. However, if any of the other gates such as G1–G15 are also being erroneously enabled at the same time, since lead 311 is HIGH, the outputs of one of these gates may go LOW forcing lead 260A to go LOW and causing the present-look state to go to a HIGH state. Since the present-look state of lead 31 should be a 0 because it is being controlled by flip-flop 354, but a 1 is indicated, this change in present-look state indicates a multiple enable problem.

With reference to FIG. 4, the setting of flip-flop 354B controls gate GOB which in turn causes the present-look to be a 0 if there is no interference between the interface circuitry. However, since a LOW signal is being applied over lead 311B by comparator CPB when the scan point associated with lead 31B is scanned, if one of the other gates (e.g., G1B) is being erroneously enabled, the present-look information which appears on lead PLB will be forced to assume a HIGH or 1 state.

If both scan points are operating correctly, each should generate a seizure report since the problem scan point should have gone from a 1 during the first test to a 0 state during this maximum interference test. If the SPC does not receive a report from one of the scanners, this indicates that this scanner is not operating correctly. To elaborate, a scanner would not generate a report if, due to interference as described above, the present-look information were a 1. This is so because the previously recorded state of the scan point was also a 1, and no change of state occurred. As explained previously, the scanners only report changes of state.

The failure of one scanner to generate a report indicates interference between the interface circuitry of that scanner. If both scanners reported a seizure this would indicate there was no interference between the scan points and both scanners were operating correctly. The SPC would then generate another order and transmit it to both the A sides and the B sides. This order causes the signal distributors to reset all the test flip-flops.

Since the maximum interference signal is still generated over leads 311 and 311B, each time the respective scanners scan the problem scan point, the present-look information for each scanner should now be a 1. Accordingly, both sides should report a disconnect indicating a 0 to 1 change in state. If both sides make the appropriate reports, then this indicates that the problem is not associated with the first scan point (i.e., 00 . . . 001) which was first thought to be erroneous.

Now the preceding procedure is repeated, but the selective bypass register PSRB and PSR are loaded with a second address 00 . . . 010 corresponding to the scan point associated with input leads 32 and 32B. This address is chosen because the original mismatch report from side B indicated this address. Thus the SPC first looks for the generation of a report from both sides indicating 0 to 1 transmission for this scan point. If the report is received over one side and not the other side, the reporting scanner is operating correctly, and the diagnostic procedure terminates. However, if both sides generate reports or neither side generates reports, then the flip-flop associated with the second scan point is set. In other words, flip-flops 355 and 355B are set when the scan point associated with lead 32 and 32B is scanned (by applying a HIGH signal on 2601 or 2601B). This scan point is simulated so that the present-look information is LOW while the LOW signal on leads 311 and 311B causes each of the other scan points to appear to generate HIGH present-look information.

The SPC now expects to receive a seizure report from both sides corresponding to the simulated 1 to 0 change of state of the second problem scan point. If the report is received over one side and not the other side, the one reporting side is selected and the diagnostic routine ends.

However if the preceding test is successful, flip-flops 355 and 355B are reset and then the SPC expects to receive a disconnect report from each scanner indicating that the scan point went from a 0 to a 1 state. If this test too is successful no error has been detected, and normal call scanning is resumed. The SPC generates the appropriate order for conveyance to signal distributors SDA and SDB so that relays S2 and S2B are deactivated. The output of the respective word buffers WBA and WBB are again transmitted back to the appropriate group gate circuits.

SUMMARY

A diagnostic arrangement is disclosed in which reports from duplicate scanners operating in synchronism are continually compared. If a mismatch of reports is detected, an error condition exists, and the scanner generating correct reports must be immediately identified. To accomplish this, a buffer bypass arrangement is activated so that only reports concerning a specified problem scan point are conveyed back to a processor and, moreover, this conveyance avoids buffering the reports as is normally instituted. When each scanner interrogates the problem scan point, that problem scan point is simulated to appear to be in a 0 state and all the other scan points are simulated to appear to be in the 1 state. This fixes any possible interference between the scan points. If a scanner generates a report for the problem scan point, the report is immediately bypassed around the buffer for immediate transmission over a data channel. If, however, a report is not generated, this indicates interference with the problem scan point. Since the processor at the receiving end expects to receive a particular report, a mistake in a received report or a failure to generate a report, indicates that a particular scanner is not operating correctly.

What is claimed is:

1. In combination, a scanner for scanning a plurality of input leads respectively associated with a plurality of scan points and each of said input leads indicating the state of the scan point associated therewith and said scanner also generating reports concerning changes in state of said scan points, transmission means including a buffer for transmitting said reports over a communication channel, said buffer temporarily storing said reports prior to transmission thereof, simulation means for causing the input lead associated with a particular scan point to assume one state, and responsive to said scanner scanning said input lead associated with said particular scan point for causing the input leads associated with the other scan points to assume a different state, and said transmission means further including bypass means for bypassing a report concerning said particular scan point around said buffer and applying said bypassed report to said transmission means for immediate transmission thereof.

2. The combination according to claim 1 wherein each of said scan points is identified by an address and wherein said scanner includes first storage means for storing the address of each scan point as said each scan point is scanned, and said simulation means comprises second storage means for storing the address identifying said particular scan point; a comparator for comparing the addresses stored in said first and second storage means, and for generating a match signal when a match occurs;

first causing means for causing said input lead associated with said particular scan point to assume said one state; actuating means responsive to said match signal for actuating said bypass means; and second causing means responsive to said match signal for causing said input leads associated with said other scan points to assume said different state.

3. The combination according to claim 2 wherein said bypass means comprises a plurality of gates actuatable by said actuating means to gate said report concerning said particular scan point from the input of said buffer directly to the output of said buffer.

4. The combination according to claim 2 wherein said first causing means comprises a plurality of logic means each connected to a different one of said input leads and controllable to cause said one input lead connected thereto to assume a specified state irrespective of the actual state of the scan point with which said one input lead is associated.

5. The combination according to claim 4 wherein said plurality of logic means comprises logic gates connected to said input leads, and a memory connected to said logic gates for selectively enabling said logic gates.

6. For use in a communication system including a scanner for sequentially scanning a plurality of input leads each associated with a different scan point, each indicating the state of the scan point associated therewith, and each being identified by an address; diagnostic apparatus for momentarily causing maximum interference between the input leads when a particular input lead is scanned comprising a register for storing the address identifying said particular input lead, logic means responsive to said stored address for generating a first signal when said scanner scans the input lead identified by said stored address, first simulation means, including memory means connected to said input leads, for causing said particular input lead to assume one state, and second simulation means responsive to said first signal for momentarily causing the other input leads to assume another state.

7. Apparatus in accordance with claim 6 wherein said scanner generates reports concerning changes of state of said scan points, wherein said reports are temporarily stored in a buffer prior to transmission thereof by transmission means over a communication channel, and wherein said diagnostic apparatus further comprises bypass means responsive to said first signal for bypassing a report from said scanner around said buffer and applying said bypassed report to said transmission means for immediate transmission thereof.

8. The method of performing diagnostic operations on first and second scanners operating synchronously but independently, each said scanner scanning the same set of scan points and independently generating reports indicating changes of state of said scan points, said reports from said first scanner being temporarily stored in a first buffer and then transmitted over a first transmission channel, and said reports from said second scanner being temporarily stored in a second buffer and then transmitted over a second transmission channel, said method comprising the steps in sequential order of comparing the reports received over said first and second transmission channels, if a mismatch is detected, operating simulation means to cause all said scan points to appear to be in one state when a scan point associated with the mismatch is scanned by said first or second scanners, bypassing a report, if any, from said first scanner pertaining to said mismatch scan point around said first buffer and transmitting that report over said first communication channel; and bypassing a report, if any, from said second scanner pertaining to said mismatch scan point around said second buffer and transmitting that report over said second communication channel, operating said simulation means to cause said mismatch scan point to appear to be in a different state and when said mismatch scan point is scanned by said first or second scanners to cause all the other scan points to appear to be in said one state, and repeating said above-specified bypassing report step.

9. For use in a telephone system including a first scanner for scanning a first plurality of input leads respectively indicating the state of a plurality of scan points and generating reports concerning changes in state of said first input leads, each of said first input leads being identified by an address, and said first scanner including a first counter for indicating the address of each said first input lead as said each first input lead is being scanned by said first scanner, a first buffer for temporarily storing said reports generated by said first scanner and then sequentially outputting said reports stored therein, first transmission means for transmitting said last-named reports over a first communication channel, a second scanner for scanning a second plurality of input leads respectively indicating the state of said plurality of scan points and generating reports concerning changes in state of said second input leads, each of said second input leads being identified by an address, and said second scanner including a second counter for indicating the address of each of said second input leads as said each second input lead is being scanned by said second counter, a second buffer for temporarily storing said reports generated by said second scanner and then sequentially outputting said reports stored therein, and second transmission means for transmitting said reports output from said second buffer over a second communication channel; a scanner diagnostic arrangement comprising means for comparing said reports transmitted over said first and second communication channels, first simulation means including a first register for storing an address identifying a particular first input lead, a first comparator for comparing said address stored in said first register with the address indicated by said first counter and when a match occurs for generating a first match signal, means for causing said particular first input lead to assume one state, and means responsive to said first match signal for causing all the other first input leads to assume a different state, first bypass means responsive to said first comparator for applying a report generated by said first scanner concerning said particular first input lead directly to said first transmission means, second simulation means including a second register for storing an address identifying a particular second input lead, a second comparator for comparing said address stored in said second register with the address indicated by said second counter and when a match occurs for generating a second match signal, means for causing said particular second input lead to assume one state, and means responsive to said second match signal for causing all the other second input leads to assume a different state, and second bypass means responsive to said second comparator for applying a report generated by said second scanner concerning said particular second input lead directly to said second transmission means.

10. For use with a scanner sequentially scanning a plurality of scan points and generating reports concerning the state of said scan points, said reports normally being stored in a buffer and then being applied to transmission means for transmission over a communication channel, means for inhibiting the application of said reports from said buffer to said transmission means, actuatable bypass means for bypassing reports from said scanner around said buffer and applying said bypassed reports directly to said transmission means for immediate transmission thereof, and means for actuating said actuable bypass means when said scanner scans a preselected scan point so that the report for said preselected scan point is applied directly to said transmission means.

* * * * *